United States Patent Office 3,539,985
Patented Nov. 10, 1970

3,539,985
OPTIMUM MULTIPLE SEISMIC
RECORD STACKING
William A. Schneider, Dallas, Emir L. Tavella, Irving,
and Milo M. Backus, Dallas, Tex., assignor to Texas
Instruments Incorporated, Dallas, Tex., a corporation
of Delaware
Continuation of abandoned application Ser. No. 628,779,
Apr. 5, 1967, which is a continuation of application Ser.
No. 389,100, Aug. 12, 1964. This application Sept. 22,
1969, Ser. No. 860,115
Int. Cl. G01v 1/28
U.S. Cl. 340—15.5                                    9 Claims

ABSTRACT OF THE DISCLOSURE

Disclosed is a seismic exploration and signal processing technique wherein there is produced an ensemble of electrical seismic traces representative of seismic signal reflections recorded at a plurality of detector stations subsequent to each of several seismic disturbances created at different times and/or locations, each ensemble comprising several sets wherein each trace of a given set is more closely related to the other traces of its set, (as by originating from the same seismic disturbance or by being detected at the same detector station) than it is to the traces of any other set. After standard static and dynamic corrections to the traces, a suite of correlation signals, $N_{ij}$, which characterize noise components in each set of traces is generated by correlating each trace of a set with itself and with each of the other traces of the set a suite of correlation signals $S_{ij}$ which characterize desired components of each set of traces is generated by correlating the sum of the traces of each set with itself and with the sum of the traces of each of the other sets, and a suite of correlation signals $Z_{io}$ which characterize noise free desired components of each set of traces is generated by correlating the sum of the traces of each set of traces with the sum of all traces in the ensemble. Thereafter, from the suites of correlation signals a plurality of control signals $Y_i$ are generated which are related to the correlation signals as expressed in the matrix equation $(S_{ij}+N_{ij})$ $(Y_i=Z_{io}$. Each of the traces is then modified according to its related control signals as by time domain filtering. The modified traces of each set are then summed to produce a single trace for each set wherein the desired components thereof are enhanced relative to the noise components.

---

Figure 1:
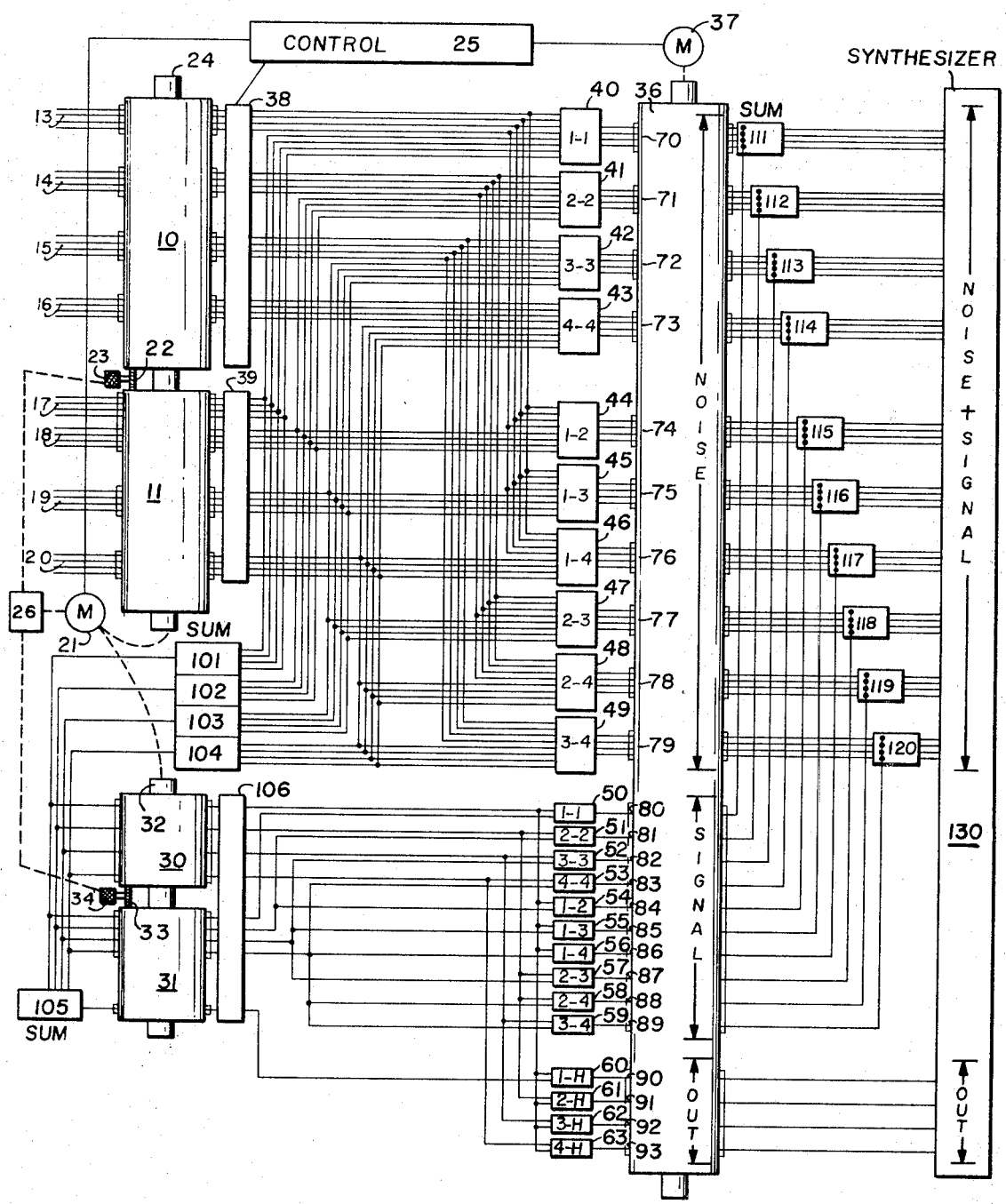

This application is a continuation of application Ser. No. 628,779, filed Apr. 5, 1967, now abandoned which was a continuation of application Ser. No. 389,100, filed Aug. 12, 1964, now abandoned.

This invention relates to signal-to-noise enhancement in data which may be reproduced as a time variable function. In a more specific aspect, the invention relates to an optimum filter based upon desired signal energy and unwanted noise energy in the data. A solution is provided for the problem of extracting desired signals from noise. In a preferred embodiment and in one application of the invention, seismic reflections or signal components in the form of amplitude variable time series are extracted from seismic noise generally detected and recorded along with the reflection signal.

The invention will be described in connection with its application to reflection seismograph operations for the enhancement of seismic reflections sensed by a seismic detector. The applicability of the method of the system to other data in the form of sets of time series will then be noted.

This invention is an improvement over prior application Ser. No. 356,776, filed Apr. 2, 1964, entitled Optimum Horizontal Stacking, in that a reflection characterization and a noise characterization derived from each seismic signal are utilized in order to produce and apply filters which will etxract reflections from the noise, or raise the reflection levels relative to the noise level. In the prior application above identified, filters were generated which were dependent upon the velocity distribution obtained other than through the use of the data being treated. In the present case, all information necessary for carrying out the signal extraction is derived from a suite of time series each of which comprises a combination of signal and noise.

In prior operations attempting to achieve the same goal as in the present case, seismic source and receiver arrays have been employed together with pass band filtering. The output signals from seismic detectors, for example, have been summed to produce a composite signal or record trace for enhancing reflections as a key to subsurface structural information. In each case the purpose is to give prominence to the important features of the received seismic signal and to reduce or remove undesired noise energy which obscures the reflection energy. Both direct summations and weighted summations of signals from seismometer arrays have been used. Frequency filtering has been applied to the summed output according to the Weiner least-mean-square-error theory. Special array geometries also have been used in an attempt to enhance the seismic reflections relative to noise.

In accordance with the present invention, the filter functions are made optimum in dependence upon the character of the signal itself.

It is an object of the present invention to characterize a given set of data functions as to signal components thereof and to characterize the same data as to noise components thereof, and thereafter to derive an optimum filter to enhance the signal-to-noise ratio and to combine filtered signals. In a more specific aspect, the invention relates to generating a suite of noise characterizing functions by cross-correlation and auto-correlation of all the members of a set of time series. The signal character of the suite is also derived by generating a suite of signal characterizing functions by cross-correlation and auto-correlation of all members of the set. The suites are then combined, element for element. A best estimate of the signal in each time series is then produced and individual filter elements are then generated and applied to the respective time series, following which the filtered signals are combined to form a composite signal or record trace.

Figure 2:
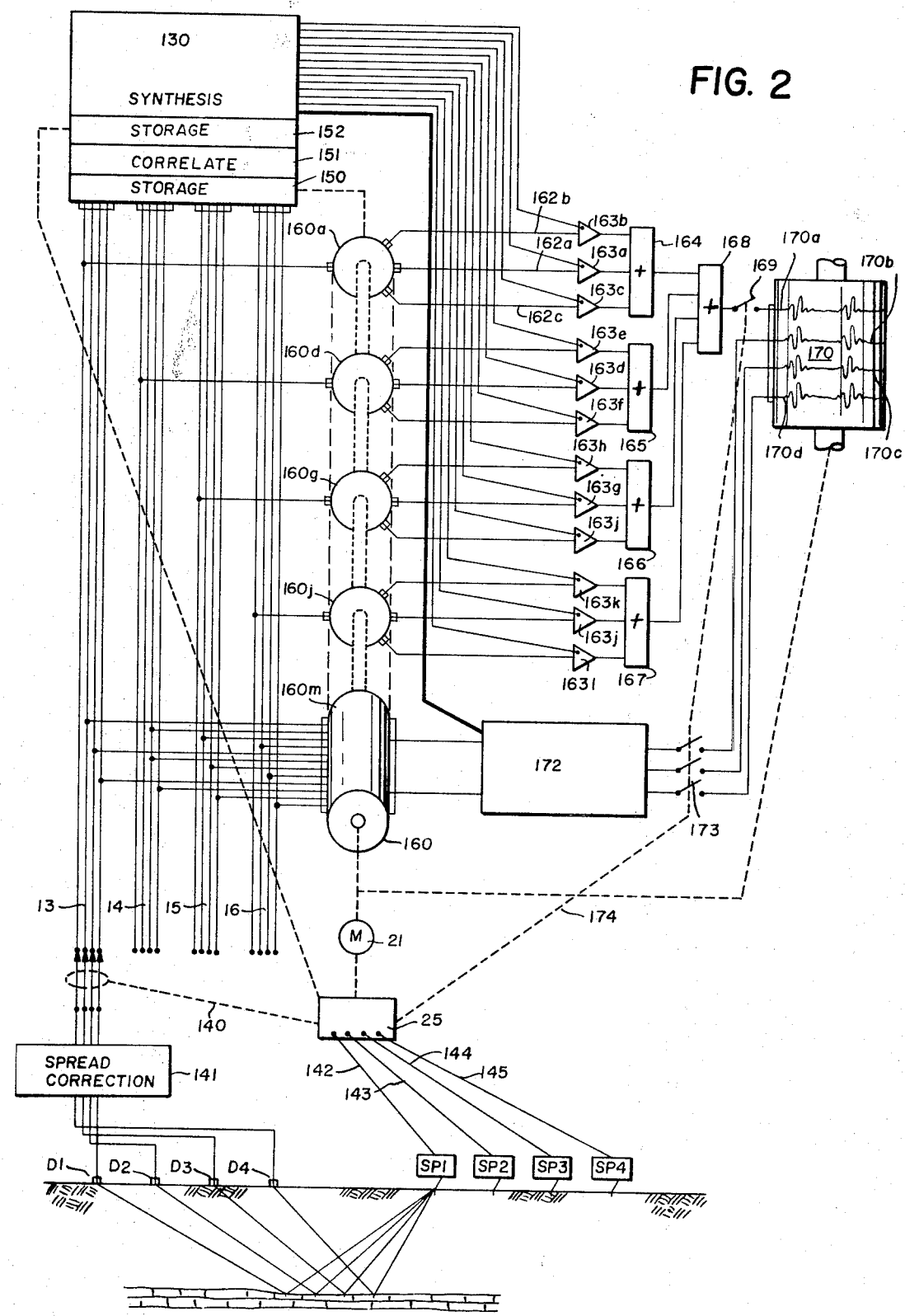
Figure 3:
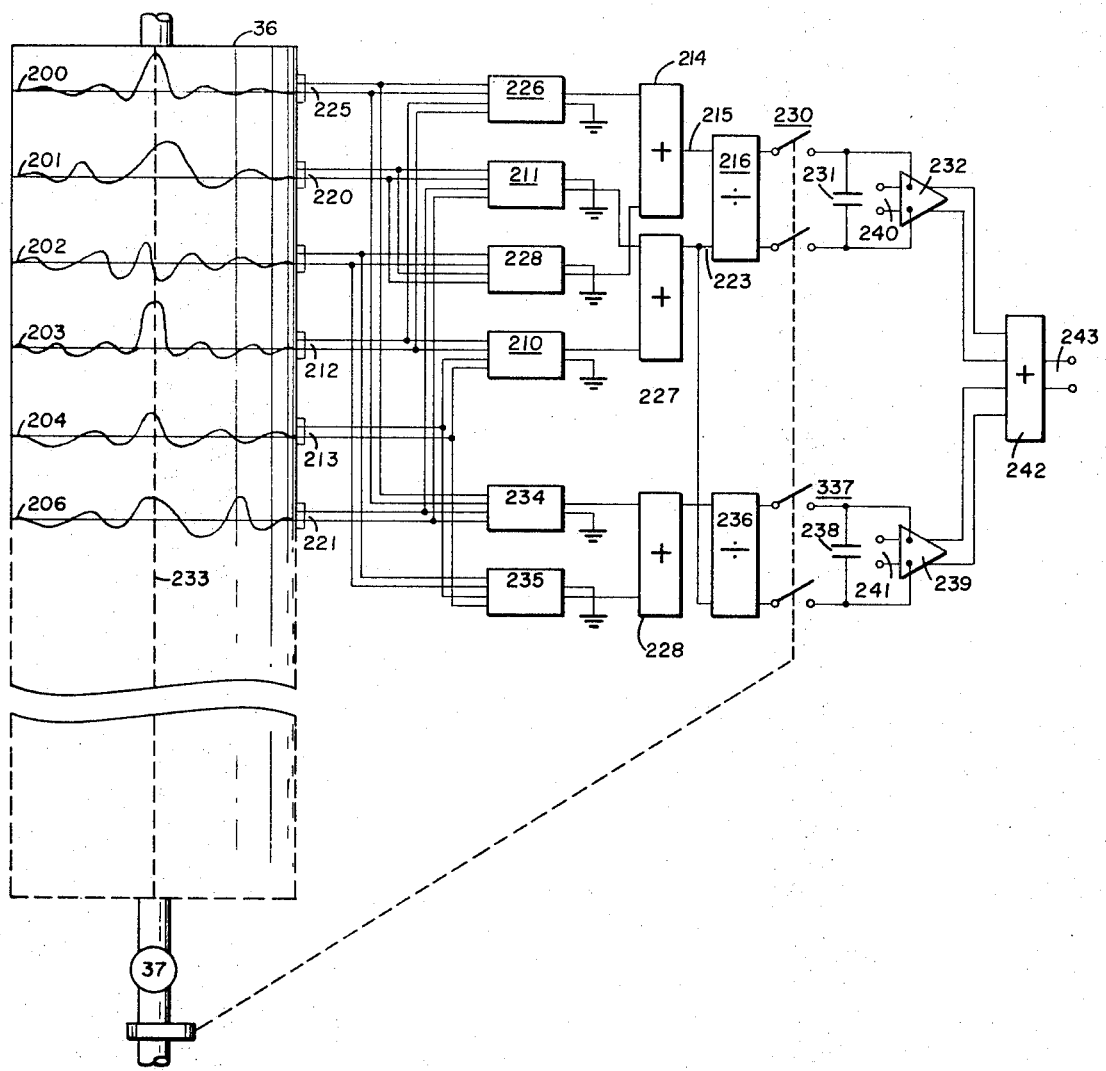

For a more complete understanding of the present invention and for further objects and advantages thereof, reference may now be had to the following description taken in conjunction with the accompanying drawings in which:

FIG. 1 is a schematic diagram of a system for producing characterizing signals;

FIG. 2 diagrammatically illustrates the overall operation of the present invention; and FIG. 3 is a more detailed diagram of a simplified synthesizer.

An application of the invention will be described wherein seismic data in the form of time series which include coherent reflection components and noise components are treated for elimination or suppression of the noise and enhancement of the reflections. In this embodiment, it will be understood that seismic signals from a detecting spread D1–D4 of FIG. 2 are recorded in reproducible form. The process of this example for securing the raw seismic signals involves the use of a plurality of shot points SP1–SP4 for generating energy detected at the spread D1–D4 of FIG. 2.

It is a well known practice to shoot shot points SP1, SP2, SP3, and SP4 successively at time intervals sufficient to allow seismic waves produced by the previous shot to die out and, following each shot, to detect the seismic energy arriving at the detecting spread in correlation with the instant at which the shot was detonated. The records of the resulting seismic signals thus produced from the detecting spread for the successive shots may be combined to enhance the reflection signal-to-noise ration.

In contrast with the foregoing procedure, the present invention is an improved method for combining the data from the successive shots optimally. The seismic signals are stored in reproducible form. The noise in each of the various channels then is characterized by generating crosscorrelation and auto-correlation signals. In a similar manner, the reflection components of each seismic signal are characterized by generating cross-correlation and auto-correlation signals. Like signal and noise characterizing signals are then combined. A noise-free characterizing signal is also generated by a selected cross-correlation operation. A synthesizer then generates a filter control signal which is the best mode for filtering and combining the seismic signals to produce output signals which are optimum representations of the reflection components enhanced relative to noise components.

As shown in FIG. 1, four seismic signals from detectors D1–D4, respectively resulting from shot S1, are recorded on two drums, i.e.: on the top four channels 13 on drum 10 and on the top four channels 17 on drum 11. For shot S2, the four signals from detectors D1–D4 are recorded on the drum 10 on channels 14 and on the drum 11 on channels 18. Similarly, for shot S3, the four signals are recorded on channels 15 and 19 and for shot S4, the four signals are recorded on channels 16 and 20.

Drums 10 and 11 are driven from a motor 21 and are linked together by an adjustable mechanism represented by the gear 22 controlled by knob 23, it being understood that drum 11 is keyed to shaft 24 and that drum 10 is freely rotatable on shaft 24 except for the coupling between drum 11 and drum 10 provided by the gear 22. This permits the drum 10 to be angularly displaced for time shifting drum 10 relative to drum 11 for cross-correlating and auto-correlating the two sets recorded on the drums 10 and 11, respectively.

It will be understood that the signals on drums 10 and 11 are recorded after correction for such static parameters as variation in the elevation of the shots S1–S4 and variations in the elevations of the detectors D1–D4. Further, corrections for normal moveout are made as is well understood in the art. The signals are stored on drums 10 and 11 under the supervision of a control unit 25.

Control unit 25 may provide supervisory control for the operation of the storage drums 10 and 11 such that the signals on drums 10 and 11 are recorded in predetermined relation to the instants of detonation of the respective shots S1–S4. Such control systems for use in making such seismograms are well known, a suitable system being described in Pat. No. 3,039,558 to Romberg.

Spread corrections are introduced into the recording operation prior to the characterization of the filters as per the present invention. Spread corrections wherein both static and dynamic variables are compensated are well known in the art. The corrections involved are discussed in Geophysics, volume XV, April 1950, page 227, "Computation Charts for Linear Increase of Velocity with Depth" by W. B. Agocs. A suitable system for applying spread corrections is disclosed in Pat. No. 3,092,805 to Koeijmans.

With the signals stored on drums 10 and 11, steps are taken to characterize the noise and the reflection components of the record and to further characterize the reflections as they would appear free of noise.

More particularly, the motor 21 drives a pair of drums 30 and 31. Drum 30 is keyed to shaft 32. Drum 31 is freely rotatable on shaft 32 except for a coupling provided by a gear 33. Gear 33 is controlled by an adjustable knob 34.

A multichannel storage drum 36 driven by motor 37 is controlled by unit 25. Drum 36 is provided for receiving and storing correlation signals which will characterize the noise components, the reflection components and the composite noise-free reflections.

CHARACTERIZATION OF NOISE COMPONENTS

A plurality of units 40–63 are employed to interconnect the drums 10, 11, 30, 31, and the drum 36. The units 40–49 are employed for the purpose of assisting in obtaining for storage on drum 36 a first suite, as on channels 70–79, of correlation functions which characterize the noise. The system illustrated in FIG. 1 including units 40–63 is in schematic form since systems for producing auto-correlation signals and cross-correlation signals are well known. The correlation may be accomplished by hand, meaning the substitution in the applicable equations hereinafter set forth of the information available from the signals recorded on drum 10. The computation may be done by a digital computer programmed for the desired correlation processes. Further analog correlation signals can be produced for storage on drum 36 in the manner described in Geophysics, volume XXVI, No. 3, "Analog Seismic Correlator" by Tullos and Cummings. In the latter case, movable magnetic heads are variably positioned on one drum for selection of the correlation delay intervals. In the system of FIG. 1, a ratchet unit 26 couples motor 21 to the adjusting element 23 to shift drum 10 relative to drum 11 for varying the delay interval for successive points on the correlation signals.

Responsive to correlation operations, the first four members of the noise correlation suite are stored on drum 36 through input channels 70 to aid characterization of the noise. More particularly, the signals stored on channels 70 on drum 36 are the auto-correlation functions of the outputs from detectors D1–D4 following a first shot S1.

The functions stored on channels 71 are the auto-correlation functions of the outputs from detectors D1–D4 following a second shot S2. The auto-correlation functions for shot S3 are recorded on channels 72 and the auto-correlation functions for shot S4 are recorded on channels 73.

The cross-correlation functions of signals from shots S1 and S2 are recorded on channels 74. The cross-correlation functions of signals from shots S1 and S3 are recorded on channels 75. The cross-correlation functions of signals from shots S1 and S4 are recorded on channels 76. The cross-correlation functions of signals from shots S2 and S3 are recorded on channels 77. The cross-correlation functions of signals from shots S2 and S4 are recorded on channels 78. The cross-correlation functions of signals from shots S3 and S4 are recorded on channels 79.

The correlation functions recorded on channels 70–79 to characterize the noise components of the seismic signals are taken over a fraction of the record length defined as a limited time-gate. The time-gate is selected by unit 38. The selected fraction is located where the noise is predominant. This generally is at a late record time.

It will be noted that the signals recorded on the channels 13 and on channels 17 are applied to the inputs to the unit 40; the signals recorded on channels 14 and 18 are connected to the inputs of unit 41; the signals recorded on channels 15 and 19 are connected to the inputs of the unit 52; and the signals recorded on channels 16 and 20 are applied to the inputs to the unit 43. The signals are reproduced from drums 10 and 11 and are auto-correlated as motor 21 drives the drums so that the signals appear in real time at the inputs to the units 40–43. The auto-correlation signals are then recorded on drum 36 for as many delay intervals, both positive and negative, as the number of points required in the filter to be produced.

For generation of cross-correlation signals, the input signals applied to unit 44 are reproduced from channels 13 and channels 18; the signals applied to the inputs of unit 45 are reproduced from channels 13 and channels 19; the signal applied to the inputs of unit 46 are reproduced from channels 13 and 20; the signals applied to the inputs of unit 47 are from channels 14 and 19; the signals applied to the inputs of unit 48 are from channels 14 and 20; and the signals applied to the inputs of unit 49 are from channels 15 and 20. Cross-correlation signals are produced in the well known manner and are stored on the drum 36. The same number of delay intervals are employed as for the auto-correlation operation. Cross-correlation can be accomplished simultaneously with the auto-correlation.

CHARACTERIZATION OF DESIRED SIGNAL COMPONENTS

In order to characterize the reflection components of the seismic signals recorded on drums 10 and 11, all of the signals from a given shot, such as the signals recorded on channels 13 and 17, are applied to a summing unit 101, the output of which is applied to a first input channel on both drums 30 and 31. The signals recorded on channels 14 and 18 are then applied to a summing unit 102, the output of which is applied to a second input channel on both of the drums 30 and 31. Similarly, the signals on channels 15 and 19 are applied to a summing unit 103 for recording on the third input channel on drums 30 and 31 and the signals from the channels 16 and 20 are applied to a summing unit 104 for recording on the fourth input channel of the drums 30 and 31. The outputs of all of the summing units 101-104 are applied to a fifth summing unit 105, the output of which is applied to a fifth input channel on drum 31.

A gating unit 106 controlled by control unit 25 is then employed in conjunction with the operation of the drums 30 and 31 under control of motor 21 to produce a suite of auto-correlation functions and cross-correlation functions at the outputs of units 50-59 which characterize the reflection components of the signals. More particularly, the gate unit 106 is controlled for producing in units 50-63 the auto-correlation functions and cross correlation functions at an early record time wherein the noise components are least bothersome. Auto-correlation signals are then recorded on channels 80-83 which represent the auto-correlation of the combined signals from shots S1, S2, S3, and S4 respectively. The signals on inputs channels 84-89 represents the various cross-correlation functions between the combined signals from shots S1-S4.

CHARACTERIZATION OF NOISE FREE SIGNAL

The combined signals from shots S1-S4 are separately cross-correlated in units 60-63 with the total summation signal from the summing unit 105 to produce and record on channels 90-93 the correlation signals representing the best estimate of the noise-free reflection. That is, the cross-correlation signals on channel 90 represent the best estimate of the noise-free seismic reflection from detectors D1-D4 that would be produced from slot S1 if the noise components were eliminated. The cross-correlation signals on channels 91-93 similarly characterize energy from shots S2-S4.

FILTER SYNTHESIS—GENERAL

The suite of correlation functions on channels 70-79 representing noise are then added to the suite of signals on channels 80-89 which represent reflections. More particularly, the auto-correlation signal on channel 80 on drums 36 is reproduced and added to the auto-correlation functions recorded on each of the four channels 70. This is done in a summing the 111. Similarly, the summing units 112-120 are employed to reproduce the noise and signal correlation signals. The outputs of the units 111-120 and the correlation signals on the channels 90-93 are then applied to a synthesizer 130 which controls a set of filters for application of all of the signals on the drum 10 to produce a combined output set of signals in which the coherent and desired components are selectively enhance relative to the unwanted noise components. The enhancement in accordance with the procedures above and hereinafter outlined is the optimum that can be obtained for the signal employed.

In connection with the operations above described, it will be noted that only four shot points are described and the signals therefrom are detected by only four detectors. In practive, more shot points may be employed and ordinarily about 24 or more detectors and signal channels are employed so that 16 channels on drum 10 form a somewhat simplified system. However, the principles and steps involved with additional channels are as above described.

The four-channel, four-shot system is illustrated in FIG. 2. Motor 21 is linked to control unit 25, which in turn is linked by a linkage 140 to a multi-channel switch unit 140a which connects the output lines from a spread correction unit 141 successively to input channels 13, 14, 15, and 16. The control unit 25 also applies detonation signals or energy by way of channels 142-145 to the blasting or detonating unit at each of shot points SP1-SP4. The drums 10, 11, 30, and 31 serve as storage for data from detector D1-D4 and are schematically combined in the unit 150 of FIG. 2. The correlation steps are performed by unit 151 as above described. The correlation signals are then stored in unit 152. The synthesis unit 130 then serves to apply or employ filter functions and filters, as will now be described.

A drum 160 having 16 channels thereon has been shown in diagrammatic form for convenience only. The signals from detectors D1-D4 from each of the shots S1-S4 are stored on drum 160. The signal from detector D1 following shot S1 from point SP1 is stored on channel 160a. The signal from detector D1 following shot S2 from point SP2 is stored on channel 160d. The signal from detector D1 following shot S3 from point SP3 is stored on signal channel 160g, and the signal from detector D1 following shot S4 from point SP4 is stored on channel 160j. Similarly, the signals from detectors D2-D3 are stored on channels 160m.

Associated with each of the channels on the drum 160 are a plurality of pick-up heads. For example, on channel 160a the three pick-up heads apply signals to each of lines 162a, 162b, and 162c. The signals on lines 162a, 162b, and 162c are then amplified in amplifiers 163a, 163b, and 163c, respectively, by amounts proportional to or controlled by a gain control voltage applied to the respective amplifiers from the synthesizer 130. The amplified signals are then applied to a summing unit 164.

The pick-up heads connected to the lines 162a-162c are spaced in time along the recording channel 160a. This time spacing, together with the controlled amplication and the summing of the signals in unit 164, comprises a time-domain filter operation of the type generally presented by Hal J. Jones et al. in a paper entitled "Magnetic Delay Line Filtering" in Geophysics, volume XX, October 1955, page 745. In a smilar manner, the signals recorded on channels 160d, 160g, and 160j are selectively amplified in amplifiers 163d-f, 163g-i, and 163j-l. The signals from channels 160d, g, and j are respectively amplified under control of synthesizer 130 and summed in units 165, 166, and 167. The output signals from the summing units 164-167 are then applied to a summing unit 168, the output of which is applied by way of a switch 169 to the input on a multichannel recorder 170. By this means, trace 170a comprises an optimally filtered and stacked representation of the signals detected by detector D1 for the shots S1-S4.

A similar filtering and stacking operation is carried out for the signals from detectors D2, D3, and D4. The latter operations are carried out in the same manner as for the signals on all channels 160a, 160d, 160g, and 160j. The details of the system have been omitted for the latter three channels with the system being represented by the unit 172. The three output signals from unit 172 are connected to three inputs of the multichannel recorder by way of switch 173. Switch 169 and switch 173 are controlled from unit 25 by the linkage 174. The signal recorded on channel 170b of recorder 170 is the optimally filtered and stacked composite of signals from detector D2 for each of shots S1–S4. The signals on channel 170c correspondingly represent the signals from detector D3 and the signals on channel 170d correspondingly represent the signals from detector D4.

From the foregoing, it will be seen that the filtering and stacking operation in the form illustrated FIG. 2 involves a time-domain filter in which the amplitude of the signal from each of the pick-up points on the recorder is selectively amplified (or attenuated) as in the amplifiers 163a–163c, following which the signals are summed.

Magnetic delay line filtering of the type illustrated in FIG. 2 is well understood in the art and is more fully described by the above-identified article by Jones et al. In In th latter case, the components of the signal are controlled in amplitude by a variable resistance in each signal line, whereas in the present case, the gain of an amplifier is controlled by a voltage from the synthesizer. The system described and illustrated in the present case utilizes directly the voltage from the synthesizer 130 which is produced from treatment of the cross-correlation and auto-correlation functions described in connection with FIG. 1. A servosystem may be employed which is responsive to such voltage to adjust a potentiometer such as used in the operations described by Jones et al.

The synthesizer 130 and its mode of operation may best be understood by referring to the signal relationships expressed in the following mathematical form. A suite of noise signals $S_{ij}$ plus the suite of noise signals $N_{ij}$ when treated by a filter having a character $Y_i$ will result in a suite of output signal ZiO. Mathematically the relationships are as set forth in Equation 1:

$$[S_{ij}+N_{ij}]\ [Y_i]=[Z_o]$$

where $S_{ij}$ is a suite of correlation signals for reflection or wanted components;
$N_{ij}$ is a suite of correlation signals for noise or unwanted components;
$Y_i$ are filter parameters; and
$Z_{io}$ is a suite of correlation signals for a composite noise-free reflection signal.

The signals $S_{ij}$ may be the signals appearing on channels 80–89 of FIG. 1. The signals $N_{ij}$ may be the signals appearing on channels 70–79 of FIG. 1. The two suites of signals are then combined as in units 111–120, so that they may be treated mathematically as set forth in Equation 2.

$$[X_{ij}]\ [Y_i]=[Z_{io}] \qquad (2)$$

where: $X_{ij}$ is a suite of combined noise and reflection correlation signals.

In order to understand the operations of the synthesizer 130, it will be helpful to consider the relationship set forth in the simplified example represented by Equation 3. Equation 3 deals with syntheis of three-point filters for each of two channels, whereas in FIG. 1, the synthesizer provides a filter of as many points as may be desired for sets of signals.

$$\begin{bmatrix}\begin{bmatrix}X11(0) & X12(0)\\X21(0) & X22(0)\end{bmatrix}\begin{bmatrix}X11(1) & X12(1)\\X21(1) & X22(1)\end{bmatrix}\begin{bmatrix}X11(2)&X12(2)\\X21(2)&X22(2)\end{bmatrix}\\\begin{bmatrix}X11(-1)&X12(-1)\\X21(-1)&X22(-1)\end{bmatrix}\begin{bmatrix}X11(0) & X12(0)\\X21(0) & X22(0)\end{bmatrix}\begin{bmatrix}X11(1)&X12(1)\\X21(1)&X22(1)\end{bmatrix}\\\begin{bmatrix}X11(-2)&X12(-2)\\X21(-2)&X22(-2)\end{bmatrix}\begin{bmatrix}X11(-1)&X12(-1)\\X21(-1)&X22(-1)\end{bmatrix}\begin{bmatrix}X11(0)&X12(0)\\X21(0)&X22(0)\end{bmatrix}\end{bmatrix}\begin{bmatrix}Y1(-1)\\Y2(-1)\\Y1(0)\\Y2(0)\\Y1(1)\\Y2(1)\end{bmatrix}=\begin{bmatrix}Z10(-1)\\Z20(-1)\\Z10(0)\\Z20(0)\\Z10(1)\\Z20(1)\end{bmatrix} \qquad (3)$$

where:

$X11(0)$ is the numerical value of the auto-correlation function of signal No. 1 at a delay time $\tau=0$:
$X11(-1)$ is the numerical value of the auto-correlation function of signal No. 1 at a delay time $\tau=-1$;
$X11(1)$ is the numerical value of the auto-correlation function of signal No. 1 at a delay time $\tau=+1$; and
$X12(0)$ is the numerical value of the cross-correlation function of signal No. 1 and signal No. 2 at a delay time $\tau=0$.

The identity of the remaining elements of the X-matrix are similarly identified.

$Y1(-1)$ is the filter weight for channel No. 1 at $\tau=-1$;
$Y2(-1)$ is the filter weight for channel No. 2 at $\tau=-1$;
$Y1(0)$ is the filter weight for channel No. 1 at $\tau=0$;
$Y2(0)$ is the filter weight for channel No. 2 at $\tau=0$;
$Y1(1)$ is the filter weight for channel No. 1 at $\tau=1$;
$Y2(1)$ is the filter weight for channel No. 2 at $\tau=1$.
$Z10(-1)$ is the numerical value of the cross-correlation of first channel signals characterizing noise-free desired components at a delay time $\tau=-1$;
$Z20(-1)$ is the numerical value of the cross-correlation of second channel signals characterizing noise-free desired components at a delay time $\tau=-1$;
$Z10(0)$ is the numerical value of the cross-correlation of first channel signals characterizing noise-free desired components at a delay time $\tau=0$;
$Z20(0)$ is the numerical value of the cross-correlation of second channel signals characterizing noise-free desired components at a delay time $\tau=0$;
$Z10(1)$ is the numerical value of the cross-correlation of first channel signals characterizing noise-free desired components at a delay time $\tau=+1$;
$Z20(1)$ is the numerical value of the cross-correlation of second channel signals characterizing noise-free desired components at a delay time $\tau=+1$.

In order to solve Equation 3 for the values of the filter points at the three delay intervals $\tau=0$, $-1$, and $+1$, the X-matrix of Equation 3 is inverted and the solution is then formulated for each of the three filter points for channels 1 and 2. The operation mathematically is indicated in Equation 4;

$$\begin{bmatrix}Y1(-1)\\Y2(-1)\\Y1(0)\\Y2(0)\\Y1(1)\\Y2(1)\end{bmatrix}=\begin{bmatrix}X\end{bmatrix}^{-1}\begin{bmatrix}Z10(-1)\\Z20(-1)\\Z10(0)\\Z20(0)\\Z10(1)\\Z20(1)\end{bmatrix} \qquad (4)$$

The inversion of Equation 3 to Equation 4 may be undertaken in accordnace with any one of several well-known techniques, of which the Crout reduction technique is exemplary. By this means, the unknown Y quantities may be evaluated for each delay interval of interest. More particularly, signals are produced, one for each delay interval, and are applied to the amplifiers such as amplifier 162a–c of FIG. 2 to control the amplitudes of the signal from channel 160 prior to addition in unit 164.

In operations involving 24 traces as mentioned earlier and in using filters having as many as 25 delay intervals or points, the matrix of Equations 1 and 2 becomes terrifically large. Such large matrices are most expeditiously evaluated and filter point signals produced in digital computers having large data-handling capacity. The operation for less complex filter problems may be carried out for the inverted matrix by analog means where accuracy in measurements may be maintained, since only addition, multiplication and division of voltages are involved. In either case, magnitudes of digital representations stored in the computer or voltages in the analog system correspond with selected points along the auto-correlation and cross-correlation functions. In the analog case, such voltages are stored on drum 36, FIG. 1.

To explain the analog operations, a simplified problem and its solution are described in connection with FIG. 3. In this example, relatively simple, two-channel, one-point filters are synthesized in accordance with the principles above described. Six characterizing correlation functions are recorded on drum 36. A signal representing the auto-correlation of signal 1 is stored on channel 200 and represents the sum of the noise correlation function and the signal correlation function. The signal on channel 201 is the combined noise and signal cross-correlation functions as between signals 1 and 2. Since the cross-correlation functions are not symmetrical, a second cross-correlation function is stored on channel 202 representing the summed signal and noise, cross-correlated from signal 2 to signal 1. Channel 203 is the combined signal and noise auto-correlation function of signal 2. Channel 204 contains a cross-correlation signal which characterizes a noise-free output signal for signal No. 1. Channel 206 contains a cross-correlation function characterizing a noise-free signal for signal 2. Mathematically, the filters A1 and A2 at delay time $\tau=0$ are such as set forth in Equation 5:

$$\begin{bmatrix} X11 & X12 \\ X21 & X22 \end{bmatrix} \begin{bmatrix} A1(0) \\ A2(0) \end{bmatrix} = \begin{bmatrix} Z10 \\ Z20 \end{bmatrix} \quad (5)$$

The solutions for the two filters A1 and A2 at a delay time $\tau=0$ are as set forth in Equations 6 and 7:

$$A1 = \frac{Z10 \; X22 - Z20 \; X12}{X11 \; X22 - X12 \; X21} \quad (6)$$

$$A2 = \frac{-Z10 \; X21 + Z20 \; X11}{X11 \; X22 - X12 \; X21} \quad (7)$$

The operations representing the solution to Equations 6 and 7 are illustrated in FIG. 3. Motor 37 drives drum 36 for cyclic reproduction of the correlation functions on channels 200–206. A signal representing the numerator of Equation 6 is produced in units 210 and 211. More particularly, the signal X22 on conductors 212 is applied to one input of unit 210. The signal Z20 on conductors 213 is applied to the second input of unit 210. Unit 210 is a multiplier, the output of which is applied to an adding unit 214, the output of which appears on input line 215 leading to a dividing unit 216. Similarly, the signal X12 appearing on conductors 220 is applied to one input of the multiplier 211. The signal Z20 on conductors 221 is applied to the second input of multiplier 211. The output, reversed in polarity, is applied to the adding unit 214. The signal on line 215 thus represents the numerator of Equation 6.

A signal representing the denominator of Equation 6 appears at the second input to the dividing unit 216 as on line 223. More particularly, the signal X11 on channel 225 and the signal X22 on channel 212 are applied to multiplier 226 with the output being applied to an adding unit 227. The signal X12 on channel 220 and the signal X21 on channel 222 are applied to the input of a multiplier 228, the output of which, reversed in polarity, is applied to the adding unit 227. The signal on line 215 is then divided by the signal on line 223 in the dividing unit 216 to provide an output appearing at the armatures of a switch 230. A condenser 231 is connected across the gain control input terminals of signal amplifier 232. Switch 230 is closed momentarily at a point in time corresponding with the zero ordinate 233 ($\tau=0$) for the signals on drum 36. Condenser 231 is thus charged to a voltage corresponding with the solution to Equation 6, as produced by the system thus far described, shown in FIG. 3.

In a similar manner, the multipliers 234 and 235 and adder 228 supply a signal representing the numerator of Equation 7 to a dividing unit 236. The denominator signal on line 223 is also applied to the dividing unit 236. Thus, at switch 237 a voltage is present representing the solution to Equation 7. The switch 237 is closed at a delay time $\tau=0$ to charge condenser 238 to a voltage corresponding with the solution of Equation 7. The latter voltage is applied to the gain control terminals of an amplifier 239.

The two signals to be filtered in accordance with the operations thus far carried out are then applied to the input terminals 240 and 241 of amplifiers 232 and 239, respectively. This signal is thus filtered or applied to a summing unit 242 to produce on output channel 243 a composite signal which is optimally filtered in accordance with the relationships expressed in Equation 5.

While the system illustrated in FIG. 3 is highly simplified, it illustrates the operation in the synthesizer 130 of FIG. 1 wherein control voltages are produced and applied to amplifiers such as the amplifier 162 of FIG. 2. With the gain control voltage thus set in condensers 231 and 238 or in other storage units, such as generically represented by condensers 231 and 238 of FIG. 3, the seismic signals may then be reproduced from storage and filtered optimally and then combined to produce a stacked output signal.

It will now be recognized that one of the problems involved in the present invention is to produce reliable characterization signals for the reflection components in a set of seismic records which are plagued by high-amplitude noise. In the operations above described, the reflection characterizing signals are derived from the data found in a portion of the seismic signals at an early record time, and thus are more free of noise than in later portions of the record. A second method of evaluating or characterizing the reflection component is to select either an arbitrary model or noise-free waveform taken from a seismic record obtained in, and representative of, the area in which the data to be filtered is obtained. A suite of correlation functions characterizing such reflection component are then provided, as on the channels 80–89, to define the signal model. The signal set and the noise set of correlation functions are then fed to the combining or summing units 111–120 for producing the set of filters.

In general, the delay intervals in the correlation operations are made the same as the spacing of the detectors in the time-domain filters. For example, if the delay intervals in the correlation operations are taken at two millisecond intervals on the seismogram, then the pick-up heads on the play-back filtering operation, such as shown in FIG. 2, would be spaced at two millisecond spacing. The filter functions represented by Equation 1, and somewhat elaborated in Equation 3, will be produced as signals or as control voltages or as stored functions, each representative of the magnitude of the solution of the equation at each of the delay intervals 0, +2, −2, +4, and −4 milliseconds and at such additional points as are required for the filter desired. For example an n-point filter of twenty-five points would require correlation signal samples in the matrix solution at forty-nine points, $\tau=0$, ±2, ±4, ±6 . . . ±48 milliseconds. The method and the system involved have no inherent limitation as to the number of points that can be evaluated. Limitation may be encountered which involve the capacity of the system employed to generate the signals characterizing the filters in analog form or in digital form.

In general, n input characterizing signals representative of noise and reflections in each seismic signal are generated by correlating each seismic signal with itself for n delay intervals and by cross-correlating each seismic signal with every other seismic signal from a given detecting station for each of 2n−1 delay intervals. Additionally, n output characterizing signals are generated by cross-correlating the sum of all of the seismic signals in the suite with a lesser sum of the seismic signals for each of $2n-1$ delay intervals.

In the example above described, the invention involves synthesis of a seismic source which excites reflection energy preferentially over noise and/or a receiving system which accepts reflections and rejects noise. It involves the application of multichannel filters to multiple source data. The invention automatically adapts the multichannel filters to the detailed saignal/noise characteristics encountered on the actual data to be enhanced. The multi-element data to be enhanced is first analyzed to determine multi-element correlation statistics of signal and noise. A multichannel filter is then produced from those statistics and applied to the data with a resulting enhancement of the desired signal information. Alternatively, a theoretical signal model or a combination of theoretical and measured signal correlation statistics are employed in the process. Specific configurations to which this process is usefully applicable include, but are not limited to the configurations described below.

One source configuration involves use of a set of seismic recordings from explosives located at different depths forming a vertical shot array. This permits the elimination of trapped and leaking mode seismic energy ordinarily produced by an explosive, on the basis of the different dependence on source depth of this noise energy from that of signal energy.

Another source configuration may involve an areal array of shots at the same depth or of a surface seismic source. In one configuration the source elements may consist of ring source arrays of varying diameter. This permits the isotropic elimination of seismic noise on the basis of its different apparent horizontal velocity from that of signal. A further configuration consists of sub-arrays of sources laid out in an in-line pattern permitting discrimination on the basis of apparent in-line horizontal phase velocity. Still another configuration consists of sub-arrays of sources laid out in an areal pattern, permitting discrimination on the basis of vector horizontal phase velocity.

A configuration for producing a set of recordings from single sources or sub-arrays, buried explosive and/or mechanical surface forming a three-dimensional source array permitting simultaneous discrimination on both of the bases above described may also be used. Similarly, a set of common depth point recordings permitting discrimination of the basis of the difference in dependence on offset of signal and various types of noise.

Several receiver configurations may be suitable. They include all the configurations noted above with reference to the source configurations where seismometers are used to form a receiving array. Three-component and/or pressure transducers as 3–4 element groups for multichannel filtering or as elements in arrays of 3–4 component instruments laid out in the various configurations above described may be used. Signals from pressure and velocity streamers in marine work, parallel streamers permitting cancellation of water propagated noise, and vertical arrays of seismometers in marine work may be treated in accordance with the present invention. Especially effective receiver configurations involve use of vertical arrays of transducers clamped or cemented in a bore-hole in land work.

The invention is applicable to any situation where signal or a prediction of signal is to be extracted from noise using multichannel data. It has application in economic prediction, sonar signal processing, nuclear surveillance, electroencephalogram and cardiogram analysis, radar, radar astronomy, magnetic field analysis and magnetic detection, electromagnetic prospection.

Thus the invention relates to treating an ensemble of related signals in the form of time series having noise components and desired components. The ensemble is grouped in sets with each set such as the signals from dectors $D1$ related one to the other more closely than any set is related to any set, i.e.: the signals from detector $D2$. The method includes generating a suite of correlation signals $N_{ij}$ which characterize noise components in each set by correlating each signal with itself and with every other signal in its set for each of a plurality of delay intervals of late time in the several series. A like suite of correlation signals $S_{ij}$ are generated which characterize desired components in each set by correlating each signal with itself and with every other signal in its set for a like plurality of delay intervals of early time in the series. Cross-correlation signals $Z_{io}$ are generated for each set by cross-correlating the sum of signals in each set with the sum of all the signals in the ensemble. Each signal is filtered in a time domain sense with the same plurality of delay intervals at relative amplitudes $(Y_i)$ as in the relationship:

$$[S_{ij}+N_{ij}][Y_i]=[Z_{io}]$$

The filtered signals of each set are then combined and recorded.

Having described the invention in connection with certain specific embodiments thereof, it is to be understood that further modifications may now suggest themselves to those skilled in the art and it is intended to cover such modifications as fall within the scope of the appended claims.

We claim;

1. A method of processing an ensemble of electrical seismic traces in the form of time series having noise components and desired components and which ensemble is grouped in sets with each set consisting of a plurality of electrical traces related to one another more closely than any set is related to any other set, comprising the steps of:
   (a) generating said ensemble of electrical seismic traces, and
   (b) operating an automatic data processing machine to perform the steps of:
      (i) generating from said electrical seismic traces a suite of electrical correlation signals $N_{ij}$ which characterize noise components in each set by correlating each electrical seismic trace with itself and with every other electrical seismic trace in its set for each of a plurality of delayed intervals,
      (ii) generating a suite of electrical correlation signals $S_{ij}$ which characterize desired components in each set,
      (iii) generating a suite of electrical correlation signals $Z_{io}$ which characterize noise-free desired components in each set,
      (iv) generating from said correlation signals a plurality of control signals $Y_i$ according to $$(S_{ij}+N_{ij})(Y_i)=(Z_{io})$$

(v) respectively relatively modifying the magnitudes of said electrical seismic traces of a set according to said control signals $Y_i$, and (vi) combining the modified electrical seismic traces of each set to produce an output electrical signal for each set wherein the desired components are enhanced relative to the noise components.

2. A method of processing an ensemble of electrical seismic traces in the form of time series having noise components and desired components and which ensemble is grouped in sets with each set consisting of a plurality of electrical traces related to one another more closely than any set is related to any other set, comprising the steps of:
   (a) generating said ensemble of electrical seismic traces, and (b) causing an automatically operable system to perform the steps of:
   (i) generating from said electrical seismic traces a suite of electrical correlation signals $N_{ij}$ which characterize noise components in each set by correlating each electrical seismic trace with itself and with every other electrical seismic trace in its set for each of a plurality of delayed intervals,
   (ii) generating a suite of electrical correlation signals $S_{ij}$ which characterize desired components in each set,
   (iii) generating a suite of electrical correlation signals $Z_{io}$ which characterize noise-free desired components in each set,
   (iv) generating from said correlation signals a plurality of control signals $Y_i$ according to $$(S_{ij}+N_{ij})(Y_i)=(Z_{io})$$

(v) respectively relatively modifying the magnitudes ofs aid electrical seismic traces of a set according to said control signals $Y_i$, and
   (vi) combining the modified electrical seismic traces of each set to produce an output electrical signal for each set wherein the desired components are enhanced relative to the noise components.

3. A method according to claim 2, wherein said electrical correlation signals $S_{ij}$ and $Z_{io}$ are generated from said electrical seismic traces.

4. A method according to claim 2, wherein said step of generating an ensemble of related electrical seismic traces includes the steps of successively creating a seismic disturbance at locations spaced differently from an array of detecting locations with a time interval between successive disturbances sufficient to allow seismic waves created by the previous disturbance to die out, the seismic waves detected at the same detector location for each disturbance forming a set of electrical seismic traces in the ensemble.

5. A method according to claim 4, wherein said electrical correlation signals $Z_{io}$ are generated for each set by cross-correlating the sum of the electrical seismic traces obtained from an array of detecting locations with the sum of all the electrical seismic traces in the ensemble.

6. A method according to claim 2, including the step of recording as an amplitude-time varying function said output electrical signal for each set.

7. A method according to claim 6, wherein said output electrical signals for all the sets are recorded in parallel on the same time scale.

8. The system for processing an ensemble of electrical seismic traces in the form of time series having noise components and desired components and which ensemble is grouped in sets with each set consisting of a plurality of electrical traces related to one another more closely than any set is related to any other set, which comprises:
   (a) means for generating said ensemble of electrical seismic traces,
   (b) machine means for generating from said electrical seismic traces a suite of electrical correlation signals $N_{ij}$ which characterize noise components in each set by correlating each electrical seismic trace with itself and with every other electrical seismic trace in its set for each of a plurality of delayed intervals,
   (c) machine means for generating a suite of electrical correlational signals $S_{ij}$ which characterize desired components in each set,
   (d) machine means for generating a suite of electrical correlation signals $Z_{io}$ which characterize noise-free desired components in each set,
   (e) machine means for generating from said correlation signals a plurality of control signals $Y_i$ according to $$(S_{ij}+N_{ij})(Y_i)=Z_{io})$$

(f) machine means for respectively relatively modifying the magnitudes of said electrical seismic traces of a set according to said control signals $Y_i$, and
   (g) machine means for combining the modified electrical seismic traces of each set to produce an output electrical signal for each set wherein the desired components are enhanced relative to the noise components.

9. A system as set forth in claim 8 wherein each of said machine means is automatically operable.

References Cited

UNITED STATES PATENTS 3,284,763  11/1966  Burg et al. _____ 340—15.5

RODNEY D. BENNETT, Primary Examiner

D. C. KAUFMAN, Assistant Examiner